(12) United States Patent
Brand (10) Patent No.: US 9,919,638 B2
(45) Date of Patent: Mar. 20, 2018

(54) MOBILE SERVICE UNIT (71) Applicant: David Paul Brand, Glencoe, MN (US)

(72) Inventor: David Paul Brand, Glencoe, MN (US)

(*) Notice: Subject to any disclaimer, the term of this patent is extended or adjusted under 35 U.S.C. 154(b) by 0 days.

(21) Appl. No.: 15/064,073

(22) Filed: Mar. 8, 2016

(65) Prior Publication Data
US 2016/0264035 A1 Sep. 15, 2016

Related U.S. Application Data (60) Provisional application No. 62/130,689, filed on Mar. 10, 2015.

(51) Int. Cl.
*B60P 3/14* (2006.01)
*B60H 1/00* (2006.01)
*B60R 1/00* (2006.01)
*B60P 3/32* (2006.01)
*B60L 1/00* (2006.01)

(52) U.S. Cl.
CPC ............ *B60P 3/14* (2013.01); *B60H 1/00364* (2013.01); *B60P 3/32* (2013.01); *B60R 1/00* (2013.01); *B60L 1/003* (2013.01); *B60R 2300/806* (2013.01)

(58) Field of Classification Search
CPC .......... B60P 3/14; B60P 3/0257; B60P 3/224; B60P 3/228; B60P 3/34; B60P 3/0252; B60P 3/07; B60R 11/06; B60R 13/0212; B60R 13/0237; B60R 7/02; B60R 11/00; B60R 13/01; B60R 2011/0007; B60H 1/262; B60H 3/06

USPC .... 296/24.32, 37.6, 26.15, 3, 104, 161, 168, 296/173, 39.1; 224/542, 543, 401, 404, 224/544

See application file for complete search history.

(56) References Cited

U.S. PATENT DOCUMENTS

| | | | | |
|---|---|---|---|---|
| 4,133,572 A * | 1/1979 | Robbins | ............... | B60P 3/14 280/789 |
| 4,643,476 A * | 2/1987 | Montgerard | ............... | B60P 3/14 144/286.1 |
| 5,383,703 A * | 1/1995 | Irvine, III | ............... | B62D 63/061 296/24.45 |
| 6,497,442 B1 * | 12/2002 | Wacker | ............... | B60P 3/14 296/24.32 |
| 8,523,256 B2 * | 9/2013 | McCoubrey | ............... | B60P 3/14 296/24.32 |
| 8,733,813 B2 * | 5/2014 | Blackwell | ............... | A61G 3/001 296/24.38 |
| 9,038,321 B2 * | 5/2015 | Leuchten | ............... | E04H 1/12 296/24.32 |

* cited by examiner

*Primary Examiner* — D Glenn Dayoan
*Assistant Examiner* — Sunsurraye Westbrook
(74) *Attorney, Agent, or Firm* — Vidas Arrett & Steinkraus (57) ABSTRACT

A mobile service building including a towable rigid frame, the frame configured to be lowered and raised by a hydraulic lift coupled to wheels and a tongue. A building is attached to the frame, the building having walls, a floor, a ceiling and a door in one of the walls, and includes an opening in the floor of the building. A downwardly facing camera is attached to the building, looking downwardly through the opening in the floor and being configured such that a driver can determine when the opening is positioned over a predetermined location.

14 Claims, 11 Drawing Sheets

MOBILE SERVICE UNIT

CROSS-REFERENCE TO RELATED APPLICATIONS

This application claims priority from provisional patent application 62/130,689, filed Mar. 10, 2015, the entire contents of which are hereby incorporated by reference.

FIELD OF THE INVENTION

The invention relates to a mobile service unit, and more particularly to a mobile service unit (MSU) with a hole in the floor and with a hydraulic frame so the unit can be positioned over a work area and the unit lowered so a worker can easily access the work area through the hole in the floor.

The MSU is a Heated, air-conditioned trailer that utilizes an innovative hydraulic lift assembly and a backup camera system to assist in the placement of the unit over a work area such as a runway status light (RWSL). It can be raise or lower within 7 second or less with a remote control. The unit is set up for working inside or out depending on the weather conditions.

BACKGROUND OF THE INVENTION

In cold climates, such as Minnesota, airport maintenance of in-ground lighting systems (e.g., runway status lights) can be an onerous task. The in-ground lighting units can become lodged with debris, sand, or ice, making removal of the light cover difficult. Heretofore, work on these lights has been performed at night (due to reduced aircraft traffic) and in the open, subjecting the technician to potentially harsh conditions. Thus, there is a need for a self-contained portable service unit that provides a more hospitable environment for the technician.

The mobile service unit (MSU) is designed to improve safety, quality and efficiency under diverse working conditions, such as hot, windy, cold, rain, sleet or snow. Many maintenance activities are required during night time hours or low light conditions. While working in a controlled environment, tasks are accomplished in a safe and productive manner, resulting in increases the quality of workmanship and enhance system reliability.

BRIEF SUMMARY OF THE INVENTION

The invention is a mobile service building on a hydraulic frame, which can be lowered or raised to place the floor of the building within a few inches of the ground. A backup camera system is arranged in the building and transmits a picture to a receiver in the vehicle towing the mobile service building to allow the driver to accurately position the opening over a predetermined work area, such as over an inground runaway status light.

The opening can be covered with a bi-fold door when not in use.

The opening can be any shape and size, but is preferably sized 2 feet by 2½ feet.

The building can have lighting and electrical outlets, powered by a generator which is mounted to the rear of the building.

The building can include a furnace, powered by one or more propane tanks, connected to the front of the building.

The building can include an air conditioner.

The building can include a a hoist suspended from the ceiling of the building, the hoist suspended above the opening.

The building can include a battery for powering the hydraulic lift, which raises and lowers the building.

The hydraulic lift can be operated with a remote control.

BRIEF DESCRIPTION OF THE DRAWINGS

An exemplary embodiment of the invention is explained in greater detail below with reference to the figures.

DETAILED DESCRIPTION OF THE INVENTION

While this invention may be embodied in many forms, there are described in detail herein specific embodiments of the invention. This description is an exemplification of the principles of the invention and is not intended to limit the invention to the particular embodiments illustrated.

Figure 1:
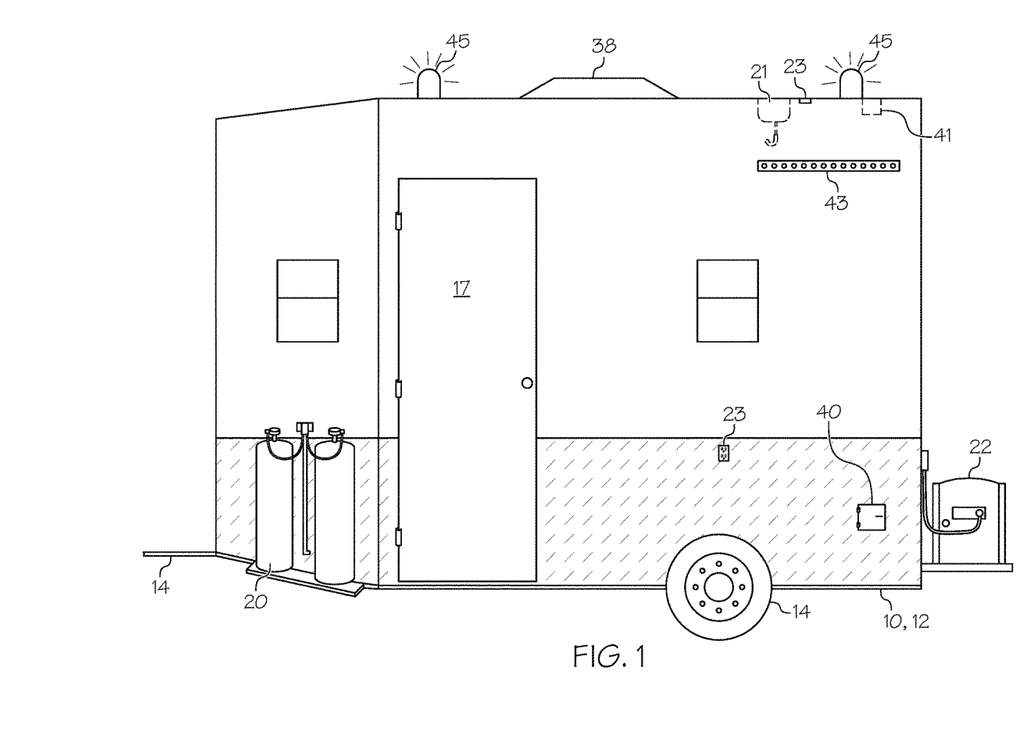
FIG. 1 is a schematic side view block diagram of the overall system.
Figure 2:
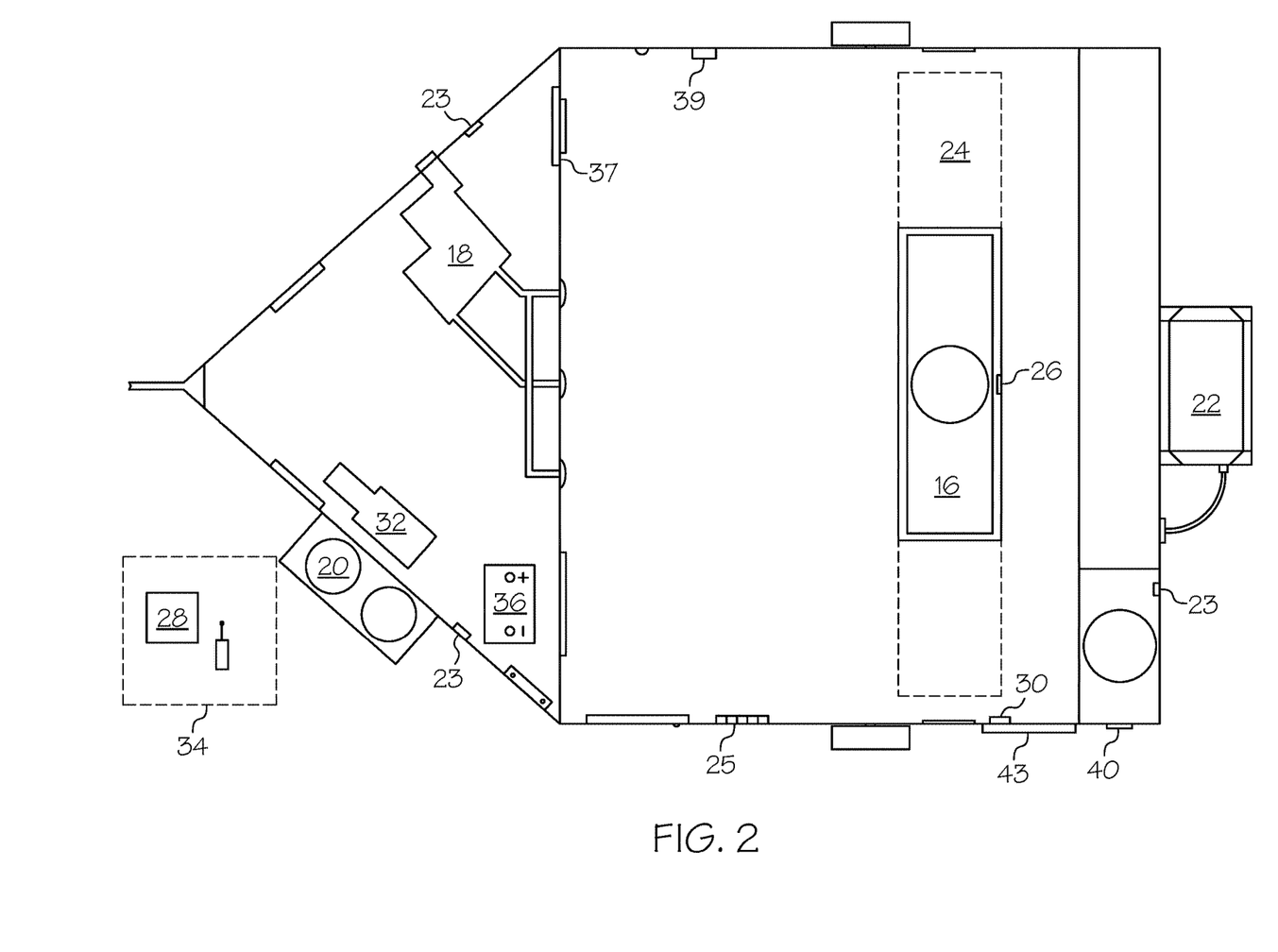
FIG. 2 is a schematic top view block diagram of the overall system.

Referring now to FIGS. 1 and 2, the mobile service unit (MSU) comprises a towed vehicle (e.g., trailer) shown generally at 10, which includes a rigid frame 12 for supporting an enclosure (the building). Attached to the frame is an axle and hitch, shown schematically at 14. The frame is reinforced in order to provide the required strength and durability. Moreover, commercially available frames can be utilized, provided that they satisfy the requisite structural requirements. For example the MSU can be built on a Berkon Outdoors hydraulic trailer (see berkon.com).

The MSU 10 includes an opening 16 in the floor, which can be any desired size and shape, but preferably 2 feet by 2½ feet. A door 17 is provided to the MSU.

The mobile service unit 10 can be raised and lowered, either manually or by remote control. The MSU includes a plurality of hydraulic rams that can be actuated to lower or raise the MSU. The hydraulic rams are coupled to an axle and the tongue of the trailer. In some embodiments, the interior floor of the MSU, and therefore the opening 16 is within 6 inches (in some embodiments 5 inches) of the ground so that the technician has easy access to the in-ground runway light or other utility to be repaired.

The MSU further includes a heater 18, which can be run off of propane 20, and a generator 22. In some embodiments, the generator is located outside of the MSU on the rear of the unit. The hoist 21 is located over a hole 16 in the floor of the MSU. Hinged doors 24 adjacent to the hole open to allow access to the in-ground light or other utility to be worked on. In some embodiments, the hole is rectangular and is, for example 2×2.5 feet.

In some embodiments, the MSU includes a hoist 21 which is suspended from the ceiling. The hoist can be used to raise covers or lighting fixtures, for example, from the in-ground lights.

The MSU further includes a camera 26 mounted near the hole, for example in the structure defining the hole. The camera faces downwardly towards the ground and a display 28 is included in the vehicle towing the MSU, for example near a rear-view mirror of the tow vehicle. In this way, the driver of the vehicle can remotely monitor the position of the MSU over a reference point on the ground and maneuver the MSU so that the hole 16 is positioned over the light or utility to be fixed. In some embodiments, the camera includes night-vision capability and/or infrared, in order to be used at night or in low light conditions. A transmitter 30 is connected to the camera 26 to wirelessly send the picture to the receiver/display 28.

Commercially available camera and hydraulic systems can be utilized. Further, an ice-house style trailer frame can be used, though the placement of the axle may need to be repositioned rearward due to the structure requirements and weight distribution of the MSU and its components. Additionally, the structure supporting the hoist will need to be strong enough to provide the required integrity.

In some embodiments, the MSU includes an aircraft band radio (I-com) so that the technicians can communicate with ground control and be advised of any aircraft.

In some embodiments, the MSU includes one or more A/C outlets, LED (or other) lighting sources to provide lighting inside and outside the MSU, which are all powered by the generator 22 and controlled at the switch panel assembly 25.

How the Unit Works

The MSU is a 6'×10'×7' structure mounted on a flatbed trailer 12 with a retractable wheel assembly. With a remote control the 3000 psi hydraulic pump assembly 32 raises and lowers the unit while maintaining a connection to the vehicle 34. Located inside the unit near the rear is a 2'×2.5' opening 16 in the floor referred to as the access area. Mounted in the access area is a night vision camera 26. Connected to the camera is a remote transmitter 30, the remote transmitter 30 sends the video signal to a remote receiver located in the vehicles cab, the signal is viewed on a 4"×5" monitor 28 mounted to the rear view mirror. The purpose of the camera system is to precisely place the unit over the hand hole. Mounted on the back of the unit is a 7000 watt portable engine generator 22 capable of supplying adequate power to accomplish any task. Located on the front exterior wall are two 30# propane tanks 20, these tanks supply the fuel for a 18,000 BTU forced air furnace 18 located just inside under the front counter.

The EU7000iS Honda generator 22 mounted to the rear of the unit, has the auto throttle feature. Auto Throttle automatically raises the RPM of the generator from idle when the load is applied, and returns the RPM to idle when the load is removed. With a tank capacity of 5.1 gallons and at a ¼ load requirement 90% of the time, this unit will run for 18 hours before a refill is required. The diverse twist lock power connection can be utilized as a site specific power connection for charging and maintaining fresh batteries while unit is sitting idle. The generator operates at a noise level between 52 and 60 decibels. This level of exposure is well below OSHA requirements while working in or outside of the unit.

The hydraulic pump assembly 32 is powered by a 12 v deep cycle battery 36 that is maintained by a power converter station 37. This station 37 converts AC to DC for the lighting and battery charging circuit. There are several GFI convenience outlets throughout the unit (reference numerals 23). The Ceiling light system has six LED fixtures with one 7,800 lumen LED spot light 41 located just above the access area. An 11,200 lumen LED spot light 43 is mounted on the exterior wall for working outside if desired. The unit's roofline has two amber LED strobes 45 and many clearance lights for high visibility. A ⅞ thick fatigue mat is attached to the floor around the access areas for knee strain reduction. A 250 lbs. capacity hoist 21 is mounted to a reinforced ceiling just above the access area for assisting in the removal of seized hand hole covers, ultimately reducing lower back strain on the technician. A 7 gallon Vac/pump unit is utilized to draw water from the hand hole and pumped out through a attached flex hose that can be strung through a wall port hole 40 and on to the ground. A two gas monitor LEL/CO2 39 is mounted on the wall near the floor just inside the unit to detect any fumes during operation.

Optional Components 250 lbs ceiling hoist 21 with T bar jig assembly, 5 KW/10,000 BTU Rooftop Heater/Air conditioner unit 38, Vac/Pump unit, I-com radio system, floor vent system, Two or four gas monitor unit 39.

Figure 3:
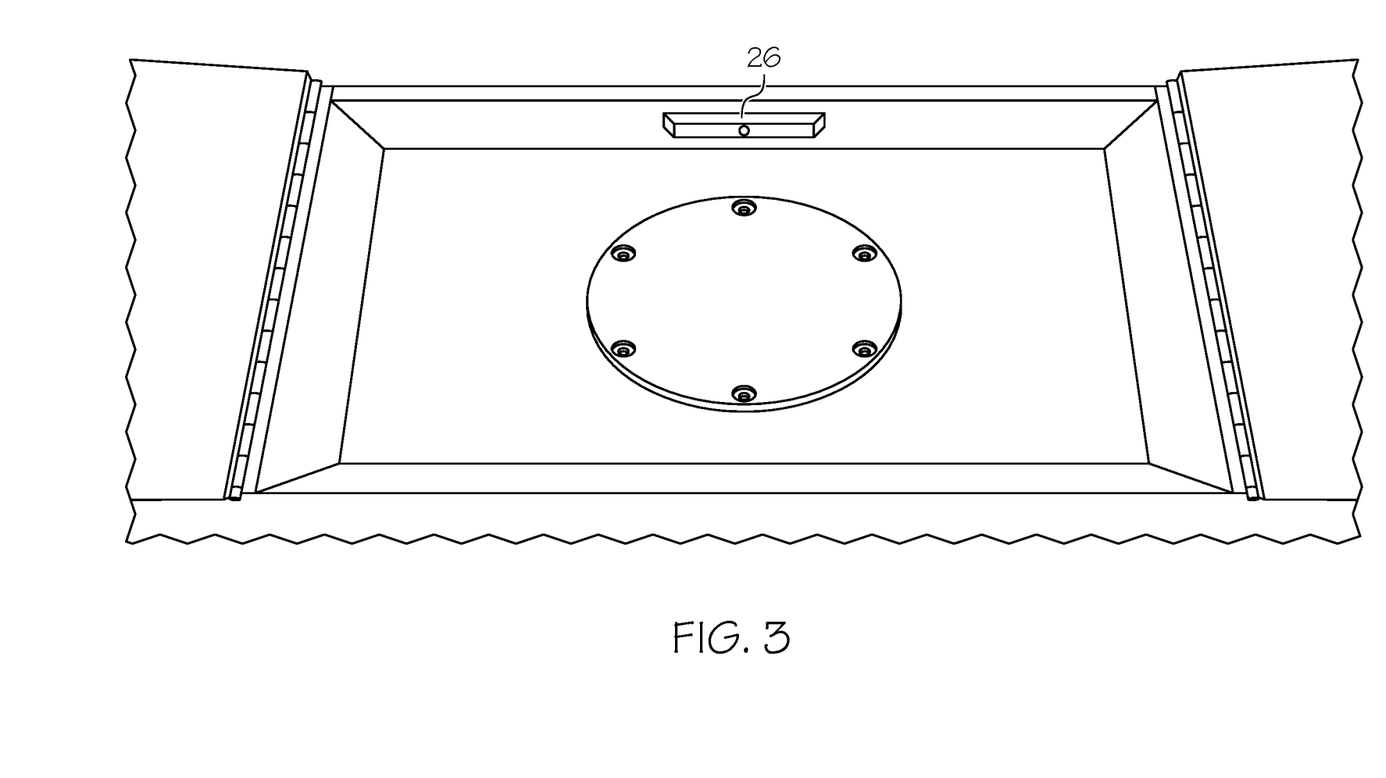
FIG. 3 shows a runway light and the ground through the hole 16 in the MSU.

When the hydraulic system lowers the frame, the access hole 16 is positioned about 5 or 6 inches above the ground, providing easy access for a worker to reach the object to be worked on, for example a runway status light (see FIG. 3).

FIG. 3 shows access doors 24 open and aligned over a hand hole 16. The 2'×2.5' opening 16 in the floor with a bi-fold door access 24, will allow the technician to work on a hand hole with ease. When the unit is lowered, the opening becomes sealed to the pavement allowing the technician to perform his task inside a heated, protected environment with no heat loss. With this feature the tasks becomes more organized, safe and efficient thus aiding in the quality of workmanship while reducing man hours to accomplish the tasks. A wireless night vision camera is mounted to the frame. (directly centered in the opening and just above the fixture), another camera is mounted on the vehicles front license plate to help assist with the precise alignment. The monitoring of both cameras is viewed from the driver's seat. This is accomplished with a split screen monitoring system that is clipped onto the rear view mirror. Both cameras are viewed simultaneously.

Figure 4:
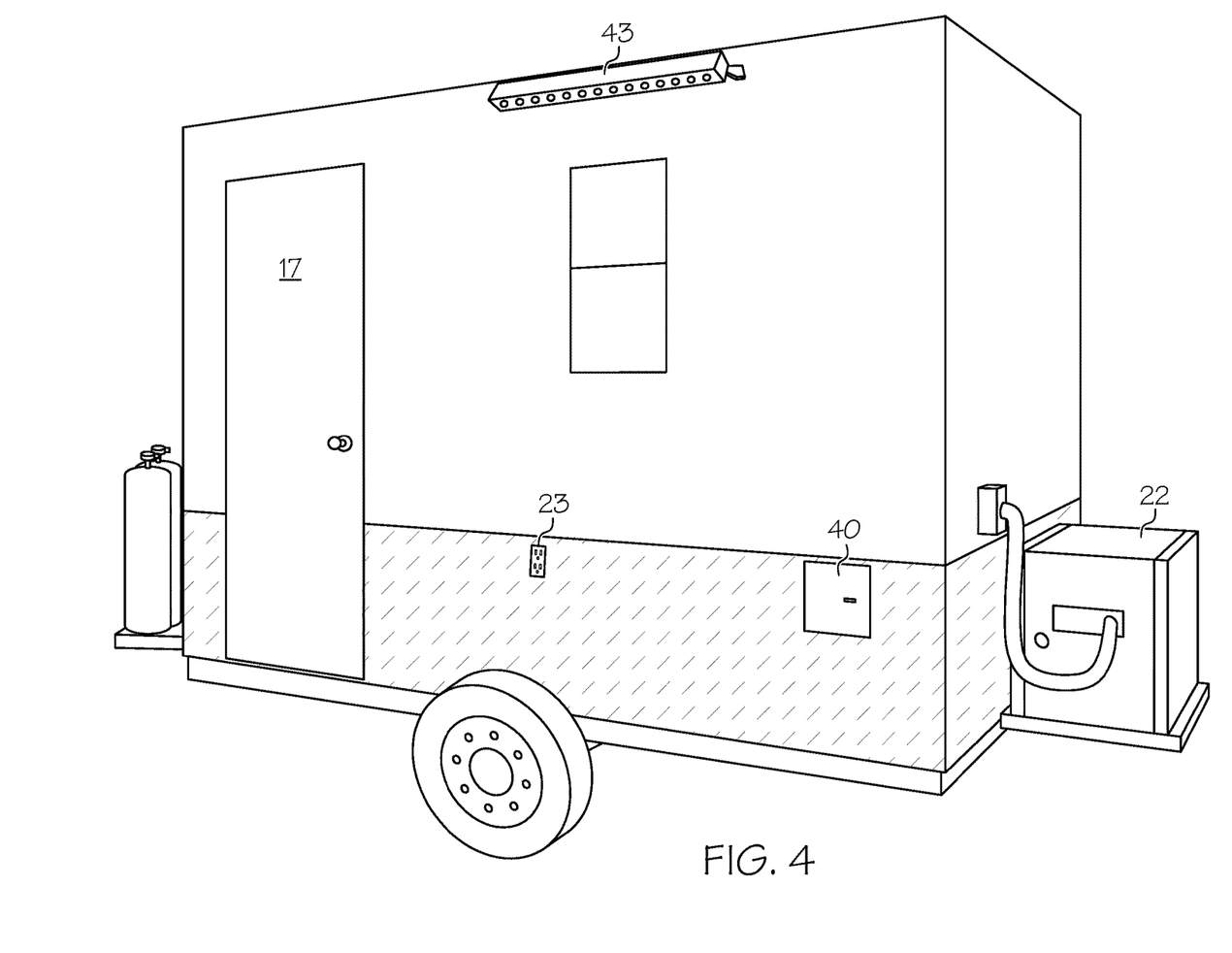
FIG. 4 shows a back and side view of the MSU.

FIG. 4 shows a back and side view of the MSU.

Figure 5:
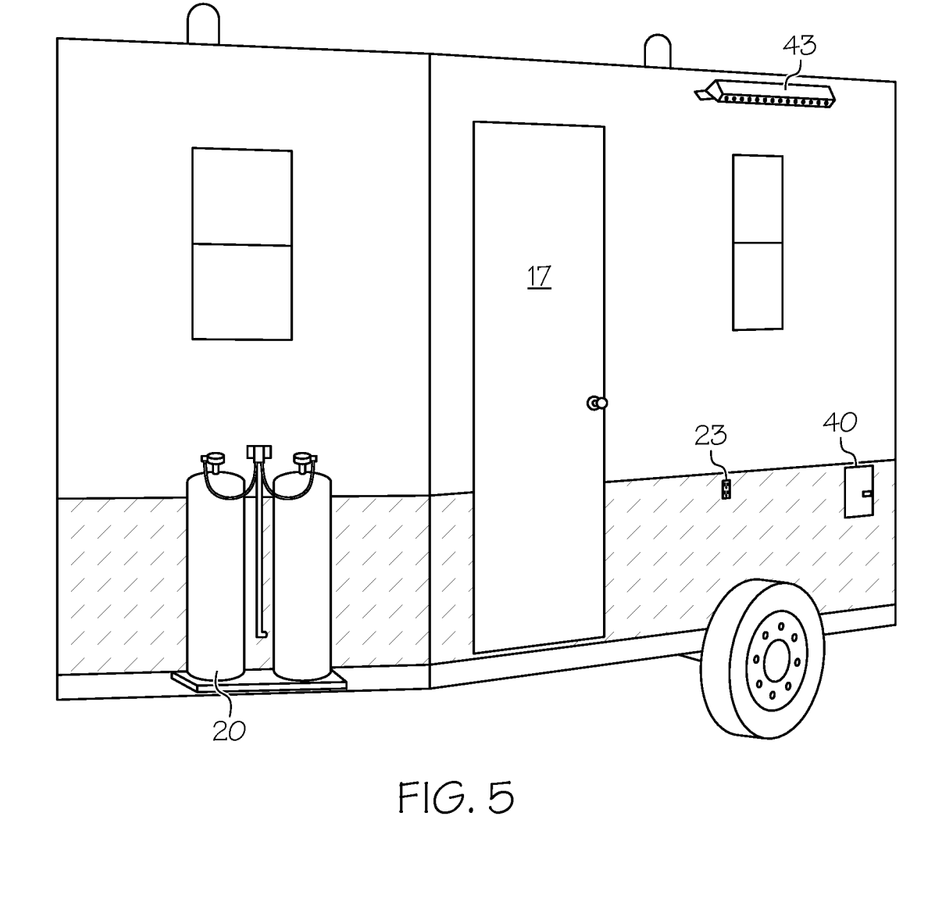
FIG. 5 shows a side view of the MSU.

FIG. 5 shows a side view of the MSU. A 12 vdc 24" Exterior LED light (upper right) is for working outside the unit during favorable weather condition. The access door 40 (lower right) is designed for the Vac/pump line sets if needed during this time. The Vac/Pump feature is designed to draw the water from hand hole with ease. The hose fits in tight quarters and no priming of a pump is needed. The water is held in the unit or simultaneously pumped to the edge of the runway at a rate of 7 GPM. Suction capacity is equivalent to 92" of vertical lift. The MSU is also highly visible with two LED strobe lights mounted on the roof and clearance lights seen from sides. The two 30 lbs propane tanks (lower left) is the fuel supply for 11,000 BTU furnace located just inside the unit.

Figure 6:
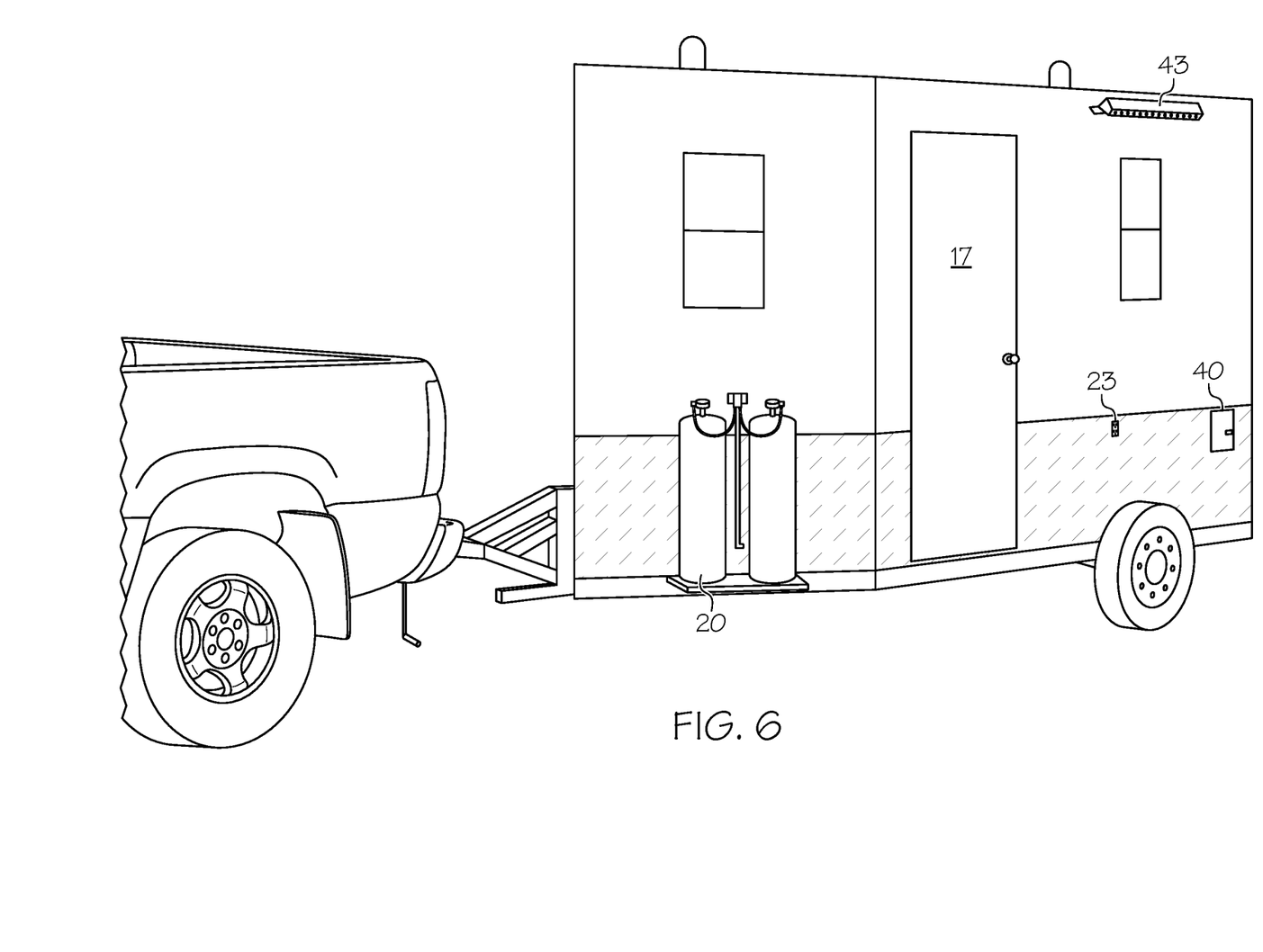
FIG. 6 shows a front and side view of the vehicle pulling the MSU.

FIG. 6 shows the vehicle connected to the MSU.

Figure 7:
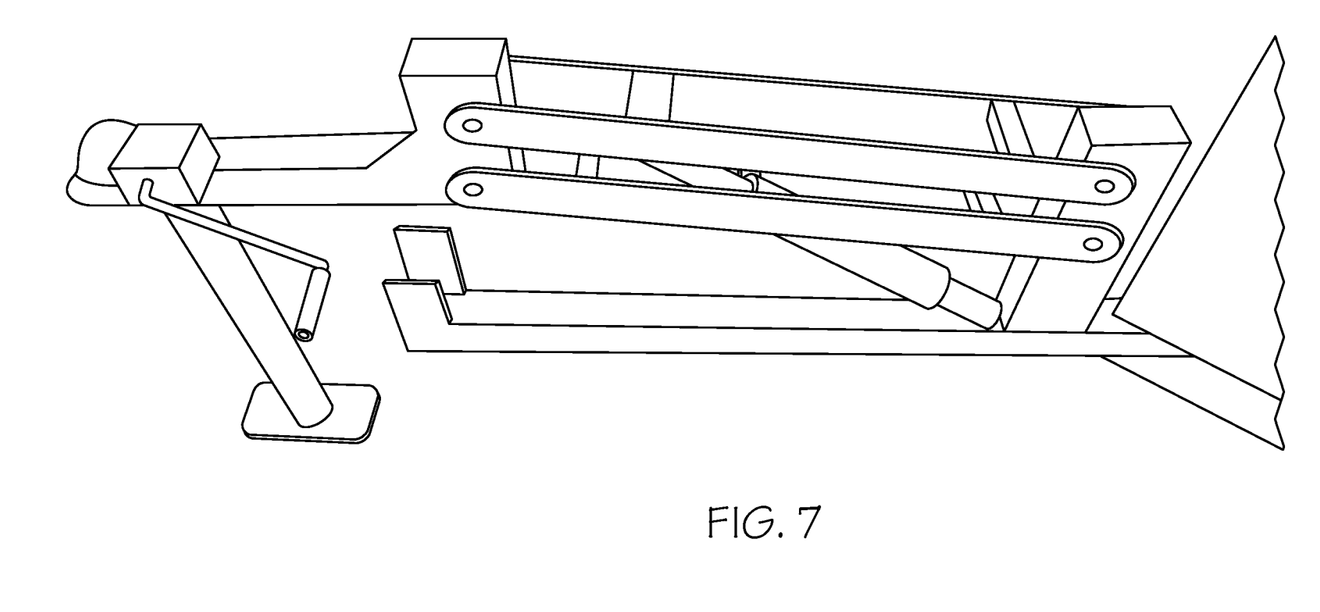
FIG. 7 shows the hitch assembly.

FIG. 7 shows the hitch assembly. The MSU 10 has a cylinder assembly that raises and lowers the front of the unit while still attached to the vehicle. The MSU can be lowered in 7 seconds.

Figure 8:
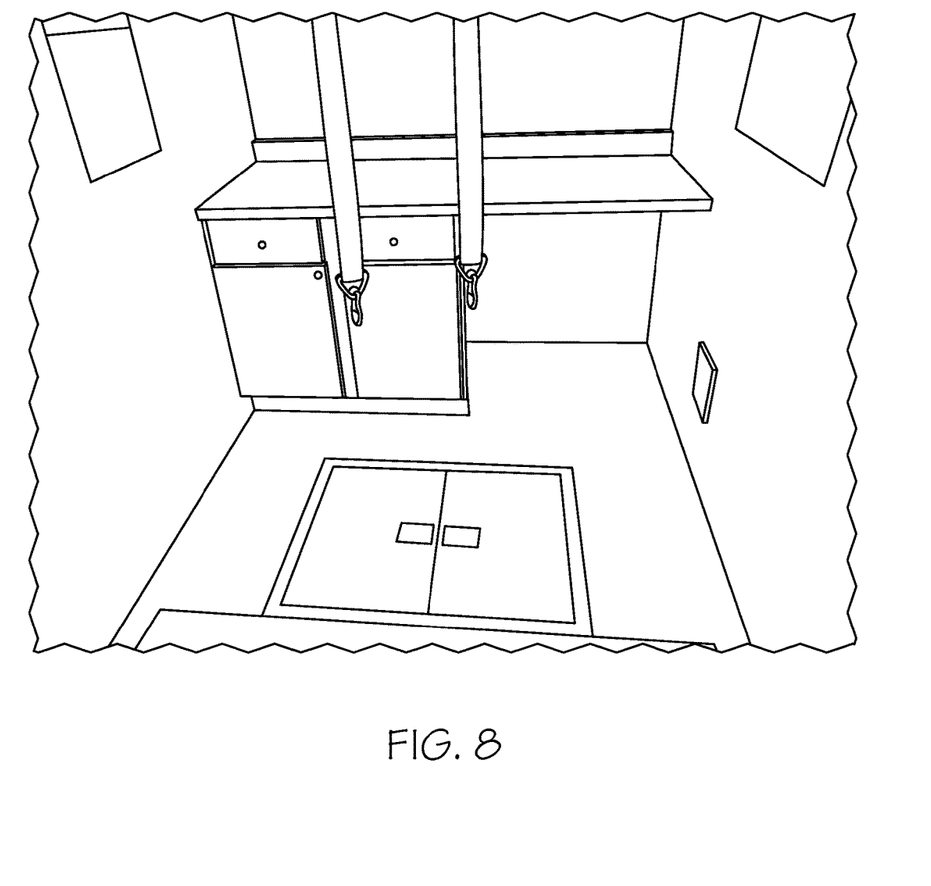
FIG. 8 shows a view of the rear interior of the MSU.

FIG. 8 is a view looking towards the rear of the unit and showing a work bench area for parts and tool storage. In the right corner is the 16 gal Vac/pump unit with hose assembly hanging on wall. The safety yellow outlines a set of bi-fold doors designed for quick access to the hand hole. When doors are closed it seals tight preventing any drafts from entering, keeping the unit at a desired temperature while maneuvering to the next repair site. The thick yellow strip is the edge of a ⅞ thick fatigue mat designed to reduce knee fatigue while kneeling alongside the opening. (Knee pads cut off circulation to legs if worn to long.)

Figure 9:
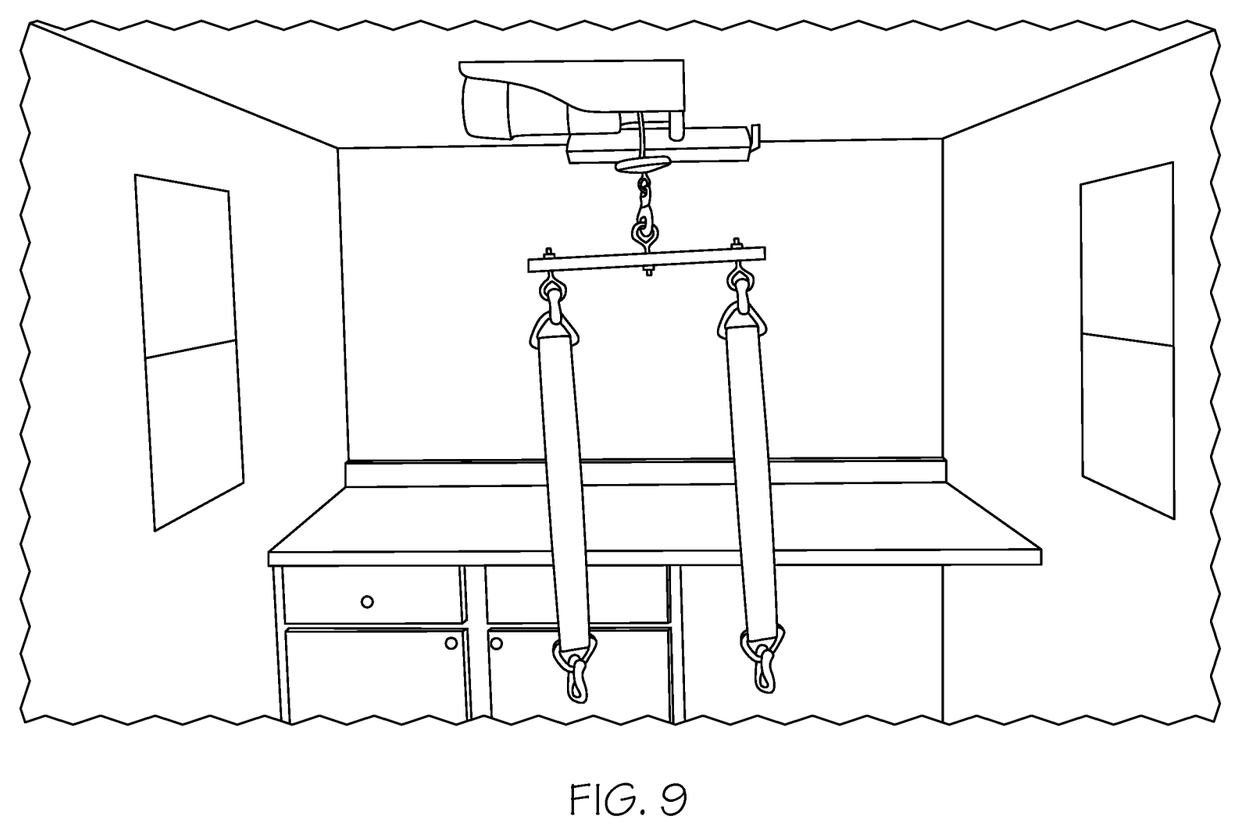
FIG. 9 is a view of the interior looking towards the back ceiling.

FIG. 9 is a view of the interior looking towards the back ceiling. The hoist 21 feature has a maximum lifting capacity of 440 lbs if cables are double looped. The capacity is cut in half if a straight connection is utilized (as seen in the picture). This hoist is designed to assist with the lifting and removing of the flush mount fixture covers when they are frozen into the runway pavement. This feature makes the task safe and efficient. The LED lights in and around the unit are designed to illuminate any shadowed corner with minimal power requirement thus allowing the generator to stay on idle (¼ load) for the duration.

Figure 10:
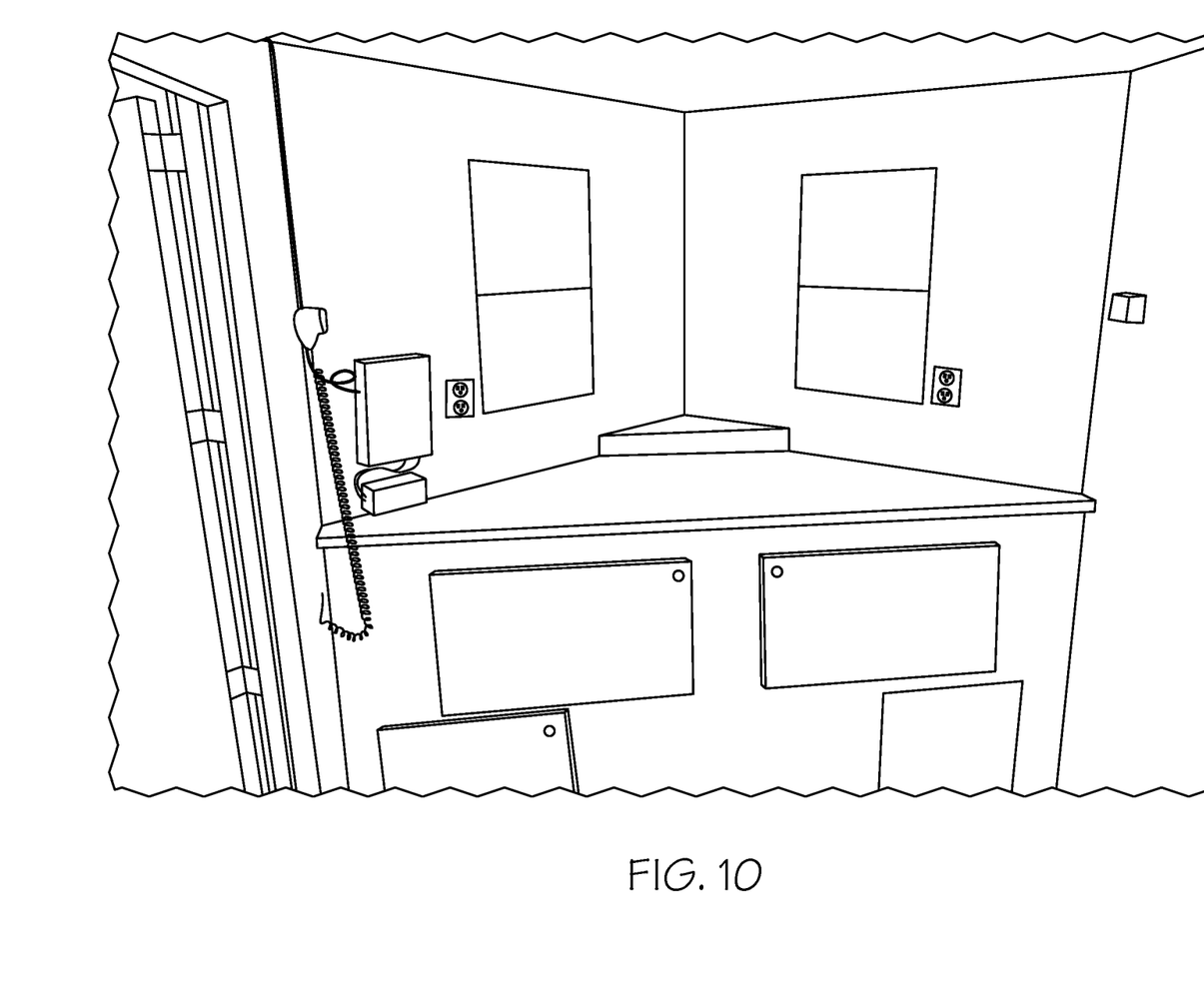
FIG. 10 is a view of the interior, towards the front of the MSU.

FIG. 10 is a view of the interior of the MSU, looking towards the front of unit. The MSU can be equipped with a radio if needed (I-com). A thermostat control (right wall) controls the 11,000 BTU, forced air furnace 18 located center just behind the three round supply and return vents. More storage, outlets and windows to round out the front counter. Lower left is a access door to a 12 VDC deep cycle battery 36. This battery is used as the main power source for hydraulic lift pump assembly. The battery then parallels to the power center 37 (lower right) which routes 12 vdc to the furnace, LED lights, strobes, radio, camera and charger system. The power station charging circuit for the furnace and LED lights, as is well known in the art. The 120 vac is fed from the generator through the power center 37 and back out to the outlets 23. If the generator were ever to fail, the MSU can still be lifted with the battery power and moved within minutes.

Figure 11:
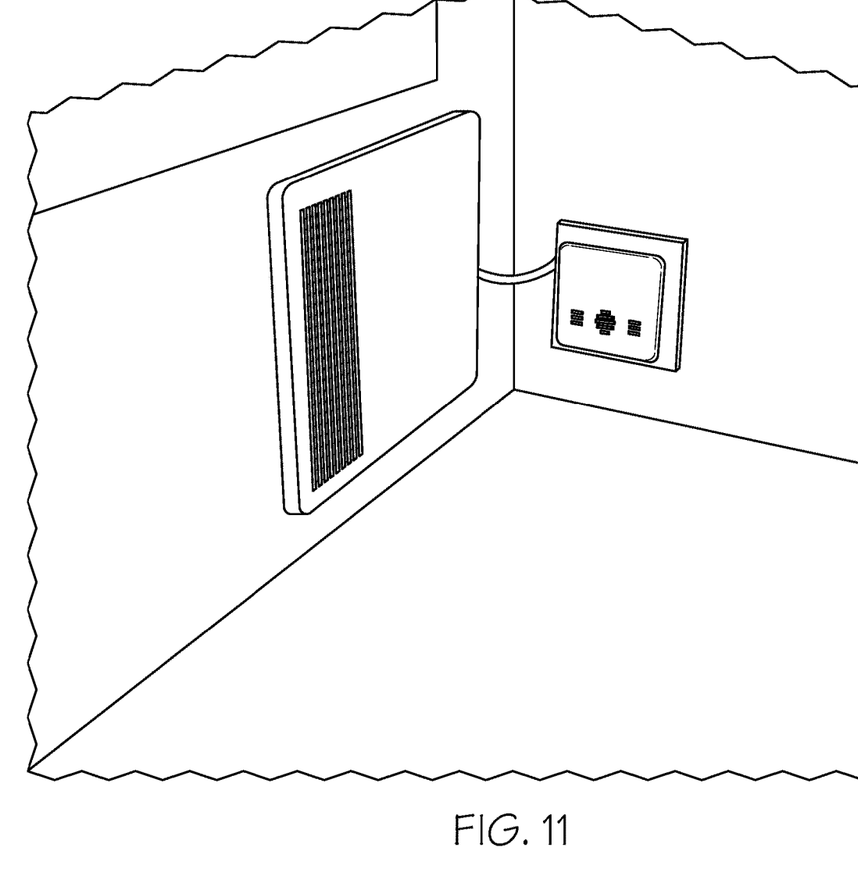
FIG. 11 is a view of the carbon monoxide detector inside the MSU.

FIG. 11 shows the propane/carbon monoxide detector (white box) 39 mounted in the unit near floor. The detector monitors for propane and exhaust fumes in the unit.

The above examples and disclosure are intended to be illustrative and not exhaustive. These examples and description will suggest many variations and alternatives to one of ordinary skill in this art. All of these alternatives and variations are intended to be included within the scope of the claims, where the term "comprising" means "including, but not limited to". Those familiar with the art may recognize other equivalents to the specific embodiments described herein which equivalents are also intended to be encompassed by the claims. Further, the particular features presented in the dependent claims can be combined with each other in other manners within the scope of the invention such that the invention should be recognized as also specifically directed to other embodiments having any other possible combination of the features of the dependent claims. For instance, for purposes of written description, any dependent claim which follows should be taken as alternatively written in a multiple dependent form from all claims which possess all antecedents referenced in such dependent claim.

What is claimed is:

1. A mobile service building for working at a predetermined location on the ground, comprising:
    a towable rigid frame, the frame configured to be lowered and raised by a hydraulic lift coupled to wheels and a tongue;
    a building attached to the frame, the building having walls, a floor, a ceiling and a door in one of the walls;
    an opening in the floor of the building; and
    a downwardly facing camera attached to the building, the downwardly facing camera looking downwardly through the opening in the floor and being configured such that a driver can determine when the opening is positioned over a predetermined location,
    wherein the mobile service building can be lowered so the floor of the mobile service building is within a few inches of the predetermined location, which can be accessed through the opening in the floor.

2. The mobile service building of claim 1 wherein the opening is selectively covered by a bi-fold door.

3. The mobile service building of claim 2 wherein the opening is sized 2 feet by 2½ feet.

4. The mobile service building of claim 3 further including a propane heater.

5. The mobile service building of claim 1 further including a hoist suspended from the ceiling of the building, the hoist suspended above the opening.

6. The mobile service building of claim 1 further including a generator connected to the rear of the building.

7. The mobile service building of claim 1 further including a transmitter connected to the downwardly facing camera to wirelessly transmit the video from the camera to a receiver in a vehicle towing the mobile service building, so the driver can position the hole over the predetermined location.

8. The mobile service building of claim 1 further including a furnace for heating the building, the furnace connected to at least one propane tank.

9. The mobile service building of claim 1 further including an air conditioner.

10. The mobile service building of claim 1 further including a battery for powering the hydraulic lift.

11. The mobile service building of claim 1 further including lighting arranged to illuminate the hole.

12. A mobile service building for working at a predetermined location on the ground, comprising:
    a towable rigid frame, the frame configured to be lowered and raised by a hydraulic lift coupled to wheels and a tongue;
    a hoist suspended from a ceiling of the mobile service building, the hoist suspended above an opening in a floor of the mobile service building; and
    a downwardly facing camera, the downwardly facing camera looking downwardly through the opening in the floor and being configured such that the driver can determine when the opening is positioned over a predetermined location,
    wherein the mobile service building can be lowered so the floor of the mobile service building is within a few inches of the predetermined location, which can be accessed through the opening in the floor.

13. The mobile service building of claim 12 further comprising a propane heater.

14. The mobile service building of claim 12, wherein the floor is no higher than 6" from ground level when the mobile service building is in the lowered configuration.

* * * * *